US012807006B2

(12) United States Patent
Beisswenger et al.

(10) Patent No.: US 12,807,006 B2
(45) Date of Patent: Nov. 24, 2026

(54) METHOD FOR OPERATING A MOTOR VEHICLE, COMPUTER PROGRAM PRODUCT, STORAGE MEDIUM AND COMPUTER DEVICE

(71) Applicant: Robert Bosch GmbH, Stuttgart (DE)

(72) Inventors: Markus Beisswenger, Schwaebisch Hall (DE); Paul Oborowski, Abstatt (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 19/065,163

(22) Filed: Feb. 27, 2025

(65) Prior Publication Data

US 2025/0276585 A1 Sep. 4, 2025

(30) Foreign Application Priority Data

Feb. 29, 2024 (DE) ..................... 10 2024 201 861.9

(51) Int. Cl.
*B60L 15/20* (2006.01)

(52) U.S. Cl.
CPC ....... *B60L 15/2009* (2013.01); *B60L 2240/12* (2013.01); *B60L 2240/423* (2013.01); *B60L 2240/461* (2013.01); *B60L 2250/26* (2013.01)

(58) Field of Classification Search
CPC ............. B60L 15/2009; B60L 2240/12; B60L 2240/423; B60L 2240/461; B60L 2250/26; B60L 3/108; B60L 7/26; B60L 2240/421; B60W 30/02; B60W 10/08; B60W 10/192; B60W 2710/081; B60W 2710/18
See application file for complete search history.

(56) References Cited

U.S. PATENT DOCUMENTS

| | | | | |
|---|---|---|---|---|
| 2013/0179015 A1* | 7/2013 | Liang | B60T 8/1755 | 701/22 |
| 2015/0284005 A1* | 10/2015 | Suzuki | B60W 30/18172 | 701/22 |
| 2017/0183008 A1* | 6/2017 | Isono | B60W 30/18172 | |
| 2017/0314676 A1* | 11/2017 | Huang | F16H 9/24 | |
| 2018/0297585 A1* | 10/2018 | Lian | B60T 8/17552 | |
| 2021/0107456 A1* | 4/2021 | Kim | B60K 17/354 | |

(Continued)

FOREIGN PATENT DOCUMENTS

| | | |
|---|---|---|
| DE | 102010003076 A1 | 8/2011 |
| DE | 102019135087 A1 | 6/2021 |

*Primary Examiner* — Thomas Ingram
(74) *Attorney, Agent, or Firm* — NORTON ROSE FULBRIGHT US LLP

(57) ABSTRACT

A method for operating a motor vehicle. The motor vehicle has at least one axle with at least one wheel assigned a wheel braking device with a controllable first actuator. The wheel is assigned a drive device with a controllable second actuator. Depending on an acceleration request or braking request, at least one torque setpoint for the actuators and a speed limit value can be specified. A first setting range extending between a zero torque and the torque setpoint is specified for a torque that can be generated by the second actuator. The second actuator is controlled within the first setting range to meet the acceleration request or braking request. An actual speed value is recorded and compared with the speed limit value, and depending on the comparison, a second setting range is provided.

11 Claims, 2 Drawing Sheets

(56) References Cited

U.S. PATENT DOCUMENTS

2021/0276573 A1* 9/2021 Ota .......................... B60T 7/12
2022/0315004 A1* 10/2022 Bensch ............... B60T 8/17616
2023/0347748 A1* 11/2023 Kurosawa ............ B60W 20/14

* cited by examiner

METHOD FOR OPERATING A MOTOR VEHICLE, COMPUTER PROGRAM PRODUCT, STORAGE MEDIUM AND COMPUTER DEVICE

FIELD

The present invention relates to a method for operating a motor vehicle, wherein the motor vehicle has at least one axle with at least one wheel, wherein the wheel is assigned a wheel braking device with a controllable first actuator, in particular an electric machine, and wherein the wheel is assigned a drive device with a controllable second actuator, in particular an electric machine.

Furthermore, the present invention relates to a computer program product which performs the above method if the computer program product is executed on a computer device. The present invention additionally relates to a machine-readable storage medium with such a computer program product and to a computer device which is specially designed to execute the computer program product or to perform the above-mentioned method.

BACKGROUND INFORMATION

It is conventional in the related art to use the existing electric drive device or devices in electrically powered motor vehicles together with or instead of wheel braking devices in order to decelerate the motor vehicle. The drive device is usually integrated, in particular at a low coefficient of friction, up to full deceleration or maximum deceleration, i.e. a maximum possible deceleration which fully exploits the physical limits which are mainly determined by the corresponding surface.

SUMMARY

According to an example embodiment of the present invention, a method is provided in which, depending on an acceleration request or braking request, at least one torque setpoint for the actuators and a speed limit value are specified, a first setting range extending between a zero torque and the torque setpoint is specified for a torque that can be generated by the second actuator, the second actuator is controlled within the first setting range to meet the acceleration request or braking request, an actual speed value is recorded and compared with the speed limit value, and in that, if the comparison detects that the speed limit value is exceeded in the case of an acceleration request or undershot in the case of a braking request, a second setting range is provided which extends beyond the zero torque to a torque limit value with a sign deviating from the torque setpoint, and the second actuator is then controlled within the second setting range. According to the present invention, the electric drive device is initially integrated into the control task (acceleration or braking) by specifying the torque setpoint in conjunction with the speed limit value. The corresponding second actuator of the drive device only follows the torque specification as long as the actual speed value (actual speed) that is set is above the speed limit value in the case of a braking request, which then defines a minimum speed, or is below the speed limit value in the case of an acceleration request, which then defines a maximum speed. In particular, a first speed limit value for a braking request and a second speed limit value for an acceleration request are specified. For example, as soon as the speed limit value is reached or undershot by activating the torque setpoint in the case of a braking request, the torque generated is reduced, with the reduction taking place in particular via a control loop. As long as the first setting range is specified, the actuator can only deviate from the torque setpoint in the direction of zero torque. If the torque setpoint is defined as a negative braking torque in the case of a braking request in this context, the actuator can only reduce the braking torque but cannot apply a positive, accelerating drive torque to raise the actual speed of the wheel or axle back to the speed limit value. The speed limit value for the braking request is usually selected such that a tendency to lock is excluded, so that if the speed falls below the limit value there is a risk that the respective wheel will lock. The torque setpoint is determined in particular as a function of the actuation of an actuating device, for example a brake pedal, by a driver of the motor vehicle and/or by a specification of a vehicle assistance system, for example in the context of an emergency braking. Similar restrictions apply in the case of an acceleration request. For example, as soon as the speed limit value is reached or exceeded by activating the torque setpoint in the case of an acceleration request, the torque generated is reduced. As long as the first adjustment range is specified, the actuator can only deviate from the torque setpoint in the direction of zero torque. If the torque setpoint is defined as a positive drive torque in the case of an acceleration request in this context, the actuator can only reduce the drive torque but cannot apply a negative braking torque to reduce the actual speed of the wheel or axle back below the speed limit value. It is possible to then control the first actuator of the wheel braking device in a supporting manner, although it is important to note that the action period for a brake control is usually longer than that for a drive control, and there is a time delay until the wheel braking device actually provides a braking torque (delay in the build-up of the clamp force and delay until the brake pads contact the brake disc). The use of the first setting range described, optionally with the aid of the wheel braking device, is sufficient in general driving operation to guarantee that exceeding or falling below the specified speed limit value is corrected again within a tolerated period of time. However, in particular in driving situations with a sudden change in the coefficient of friction or a sudden high torque requirement, it is possible that the speed specification will not be maintained for a longer period of time. This can be explained by the fact that the control loop of the electric drive device is initially limited to the first setting range described and no torque can act that is opposite to the speed difference. Since the wheel braking device can only ever generate a torque that is opposite to the direction of movement of the wheel, a positive wheel speed will always result in a negative braking torque, i.e. the wheel braking device cannot be used for the task of wheel acceleration, but only for wheel deceleration. When limited to the first setting range, only a tire longitudinal force remains for wheel acceleration, which tire longitudinal force depends on the ground surface and is very small, in particular at low coefficients of friction. As a result, the possible wheel acceleration is small and limited and the duration during which the speed falls below the specified limit can be long. In the event that wheel deceleration is necessary, the brake can in principle be used as described, but this may cause mechanical tension in the drive train if the use of the brake is not precisely coordinated in time, as otherwise the drive and brake will provide opposing torques. Since the duration of the speed falling below (braking case) or exceeding (drive case) the specified speed limit has a direct influence on the dynamic driving state of the vehicle, this can lead to a short-term loss of, in particular, steering control and lateral stability. This situation is solved by the present invention and the time until the speed follows the speed specification is advantageously drastically reduced. This significantly improves both steering control and lateral stability in the situations described. The described advantages are achieved according to the present invention in that, when the described deviation from the actual speed value to the respective speed limit value is detected, the second setting range is provided, which allows the setting of torques with a sign deviating from the respectively valid torque setpoint, so that the drive device can also set a positive drive torque in the case of a braking request and a negative braking torque in the case of an acceleration request. This happens accordingly by controlling the second actuator within the second setting range. The second setting range is in particular a direct extension of the first setting range and/or replaces it at least for a specified period of time. For example, a change is made from the first setting range to the second setting range, with the second setting range then extending from the torque setpoint to the torque limit value, i.e. a range that includes a change of sign. The control is then carried out with the aim of bringing the actual speed value closer to the speed limit value until it exceeds the speed limit value again (braking request) or falls below it (acceleration request).

According to a preferred development of the present invention, it is provided that an actual value of a wheel speed of the wheel and/or an actual value of an axle speed of the axle is recorded as the actual speed value. This advantageously ensures that the drive device is optimally integrated into the control task. Preferably, the actual value of the axle speed is recorded in the case of an axle drive, and the actual value of the respective wheel speed is recorded in the case of an individual wheel drive.

According to an example embodiment of the present invention, it is particularly preferred that the second setting range is only provided if the actual speed value deviates from the speed limit value beyond a specified tolerance. This results in the advantage that the efficiency of the method according to the present invention is advantageously increased because the second setting range is not provided and the control adapted accordingly for every slight deviation, i.e., falling below or exceeding the limit.

According to a preferred development of the present invention, it is provided that the second setting range is only provided for a specified period of time. This advantageously ensures that driving safety is not compromised, for example due to a malfunction of the control system, because the corresponding exceeding or falling below the zero torque is only permitted for the specified period of time. This means that only a short-term extension of the setting range into the positive range (braking request) or negative range (acceleration request) is carried out, which must be immediately reduced to the corresponding zero torque after the specified period of time. In particular, a period of time in the range of seconds or fractions of a second is provided, for example less than 0.5 seconds or less than 1 second.

It is particularly preferred that the provision of the second setting range is maintained beyond the specified period of time if a specified release signal is detected within the period of time. This has the advantage that the provision of the second setting range is validated by the external release signal in order to always ensure driving safety. If the release signal is detected, the corresponding torque does not have to be reduced to zero torque, but can be modulated within the second setting range. For example, a corresponding release signal is generated depending on an actual value of wheel slip and/or a torque at the respective wheel.

According to a preferred development of the present invention, it is provided that the release signal is generated by a control device assigned to the first actuator and/or by a central control unit, sent to a control device of the second actuator and/or received by a control device of the second actuator. Such a procedure advantageously ensures that the release signal is generated and processed independently externally, so that the integrity of the method according to the present invention is further improved.

It is particularly preferred that the provision of the second setting range is terminated when the actual speed value at least reaches the speed limit value again, in particular exceeds the speed limit value in the case of a braking request or falls below it in the case of an acceleration request. This further improves the efficiency of the method according to the present invention because the second setting range is only provided for as long as it is needed to ensure driving stability.

According to a preferred development of the present invention, it is provided that the torque setpoint and/or the speed limit value are specified by a central control unit. Such a specification creates a particularly advantageous possibility for vehicle-wide specification of the values, so that the method according to the present invention can be performed accordingly on each involved wheel of the motor vehicle.

According to an example embodiment of the present invention, it is particularly preferred that each of the actuators is assigned its own control device, which is in particular connected to a central control unit for communication purposes, wherein each of the actuators is controlled by the control device assigned thereto. Such a separate control device for each of the actuators has the advantage that the actuators can always be controlled safely and independently of one another. If the central control unit as described above is additionally provided, in particular as part of a braking system, an advantageous distributed concept results in which the control devices each form actuating components and the control unit forms setpoint or limit value-giving components.

A computer program product according to the present invention for execution on a computer device performs the method according to the present invention when used as intended. This results in the advantages mentioned above.

A machine-readable storage medium according to the present invention includes the computer program product according to the present invention stored thereon.

A computer device of the present invention is specifically configured to execute the computer program product according to the present invention or to perform the method according to the present invention. This also results in the advantages mentioned above. Preferably, the computer device is a control unit and/or control device assigned to a motor vehicle, in particular arranged in the motor vehicle.

For example, a corresponding motor vehicle has at least one axle with one wheel, wherein the wheel is assigned a wheel braking device with a controllable first actuator, in particular an electric machine, and wherein the wheel is assigned a drive device with a controllable second actuator, in particular an electric machine, and includes at least one computer device according to the present invention designed as a central control unit and/or a computer device according to the present invention designed as a control device assigned to at least one of the actuators. This results in the advantages mentioned above. Particularly preferably, the motor vehicle has at least a first and a second wheel on the axle, wherein the first wheel, in particular assigned to a left side of the motor vehicle, is assigned a first wheel braking device with a controllable first actuator, in particular an electric machine, wherein the second wheel, in particular assigned to a right side of the motor vehicle, is assigned a second wheel braking device with a further controllable first actuator, in particular an electric machine, and wherein the wheels are assigned a common drive device, or each of the wheels is assigned a separate drive device, with one or each having one controllable second actuator, in particular an electric machine. This also results in the advantages mentioned above.

Further preferred features and combinations of features result from what was described above and from the rest of the disclosure herein. The present invention is explained in more detail below with reference to the figures.

DETAILED DESCRIPTION OF EXAMPLE EMBODIMENTS

Figure 1:
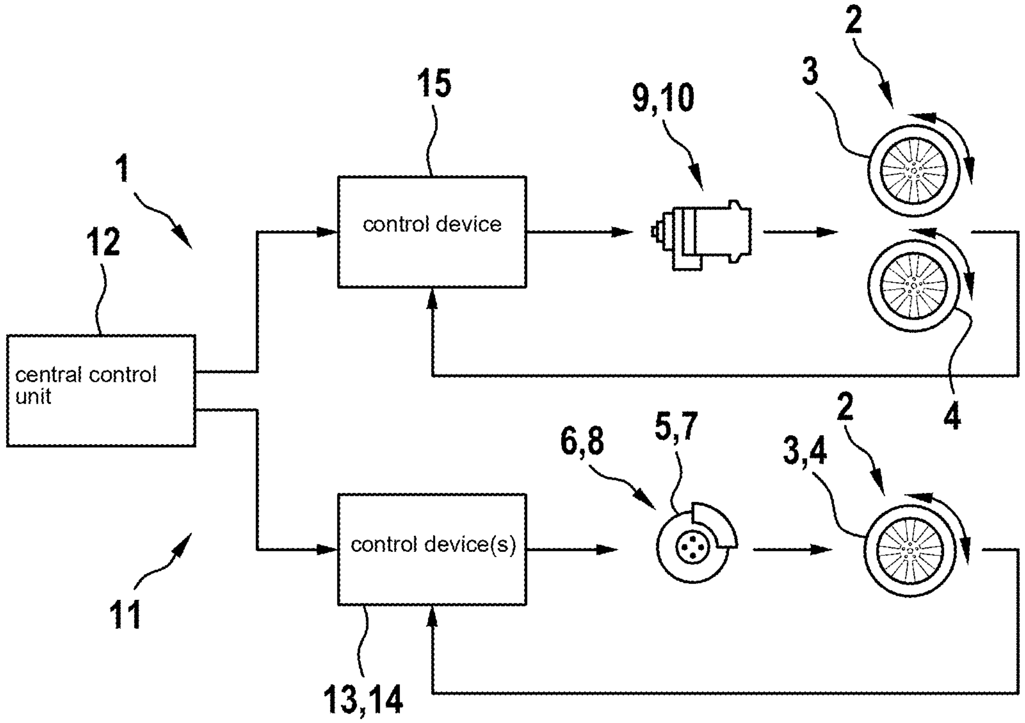
FIG. 1 shows components of an advantageous motor vehicle, according to an example embodiment of the present invention.

FIG. 1 shows, merely schematically, components of an advantageous motor vehicle 1 and their connections to one another. The motor vehicle 1 has at least one, preferably two, axles 2, which are not directly visible in the illustration. The axle 2 has a first wheel 3 assigned to a left side of the motor vehicle 1 and a second wheel 4 assigned to a right side of the motor vehicle 1.

The first wheel 3 is assigned a first wheel braking device 5 with a controllable first actuator 6, which in this case is designed as an electric machine. The second wheel 4 is assigned a second wheel braking device 7 with a controllable further first actuator 8, which in this case is also designed as an electric machine. The wheel braking devices 5, 7 and the actuators 6, 8 are identical in design. In FIG. 1, therefore, only one of the wheel braking devices 5, 7 with the respective actuator 6, 8 is indicated by way of example.

In the present case, the wheels 3, 4 are also assigned a common drive device 9, which acts on the respective wheels 3, 4 in particular via an open differential via the axle 2. For this purpose, the drive device 9 has a controllable second actuator 10 designed as an electric machine.

A control assembly 11 is also provided for controlling the actuators 6, 8, 10. The control assembly 11 has a central control unit 12 and a plurality of control devices 13, 14, 15 connected thereto for communication purposes, each of which is assigned to exactly one of the actuators 6, 8, 10 and is designed to control the respective actuator 6, 8, 10. A first control device 13 is assigned to the first actuator 6, a further first control device 14 is assigned to the further first actuator 8 and a second control device 15 is assigned to the second actuator 10.

The central control unit 12 is designed to specify certain values to the control devices 13, 14, 15 which are in particular subordinate thereto, depending on which values the control devices 13, 14, 15 then control the corresponding actuators 6, 8, 10. In the present case, the central control unit 12 is designed to specify torque setpoints and speed limit values. The control devices 13, 14, 15 are designed to carry out a speed control as a function of a current wheel (rotational) speed or axle (rotational) speed by correspondingly controlling the actuators 6, 8, 10. This is indicated by corresponding arrows.

Figure 2:
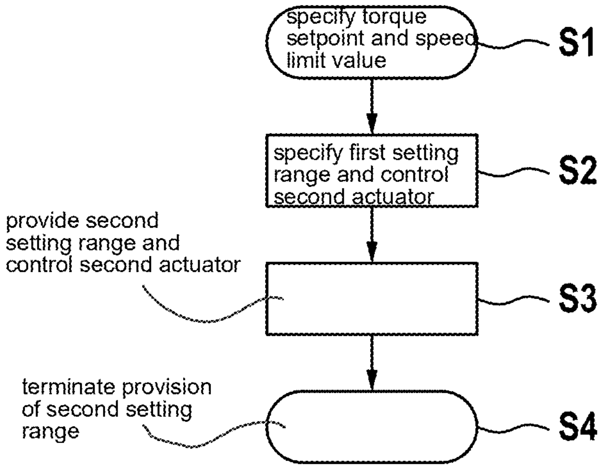
FIG. 2 shows a method for operating the motor vehicle, according to an example embodiment of the present invention.

An advantageous method for operating the motor vehicle 1 is described below with reference to FIG. 2. For this purpose, FIG. 2 shows the method using a flow chart. In particular, the method ensures that the drive device 9 is always optimally integrated into a control task for meeting an acceleration request or braking request. The method is described using the example of a wheel control for one of the wheels 3, 4 and, as indicated above, is carried out by means of the control assembly 11.

In a step S1, the method begins with at least one torque setpoint for the actuators 6, 8, 10 and a speed limit value being specified, in particular by the central control unit 12, depending on an acceleration request or braking request.

In a step S2, a first setting range extending between a zero torque and the torque setpoint is specified for a torque that can be generated by the second actuator 10, and the second actuator 10 is controlled within the first setting range to meet the acceleration request or braking request. At the same time, an actual speed value is recorded and compared with the speed limit value. Because the drive device 9 is assigned to the axle 2 as an axle drive, an actual value of an axle speed of the axle is recorded as the actual speed value.

If the comparison detects that the speed limit value is exceeded in the case of an acceleration request or is fallen below in the case of a braking request, the method is continued in a step S3.

In step S3, a second setting range is provided which extends beyond the zero torque to a torque limit value with a sign deviating from the torque setpoint, and the second actuator 10 is then controlled within the second setting range. Preferably, the second setting range is only provided if the actual speed value deviates from the speed limit value beyond a specified tolerance, in particular with respect to the relative or absolute deviation of the values from one another and/or after a specified period of time.

The second setting range is initially only provided for a specified period of time. The provision of the second setting range beyond the specified period of time is only maintained if a specified release signal is detected within the period of time. The release signal is generated in particular by one of the control devices 13, 14 assigned to the respective first actuator 6, 8 and/or the central control unit 12, sent to the control device 15 of the second actuator 10 and/or received by the control device 15.

The method ends in a step S4 in which the provision of the second setting range is terminated when the actual speed value at least reaches the speed limit value again, in particular exceeds the speed limit value in the case of a braking request or falls below it in the case of an acceleration request.

Figure 3:
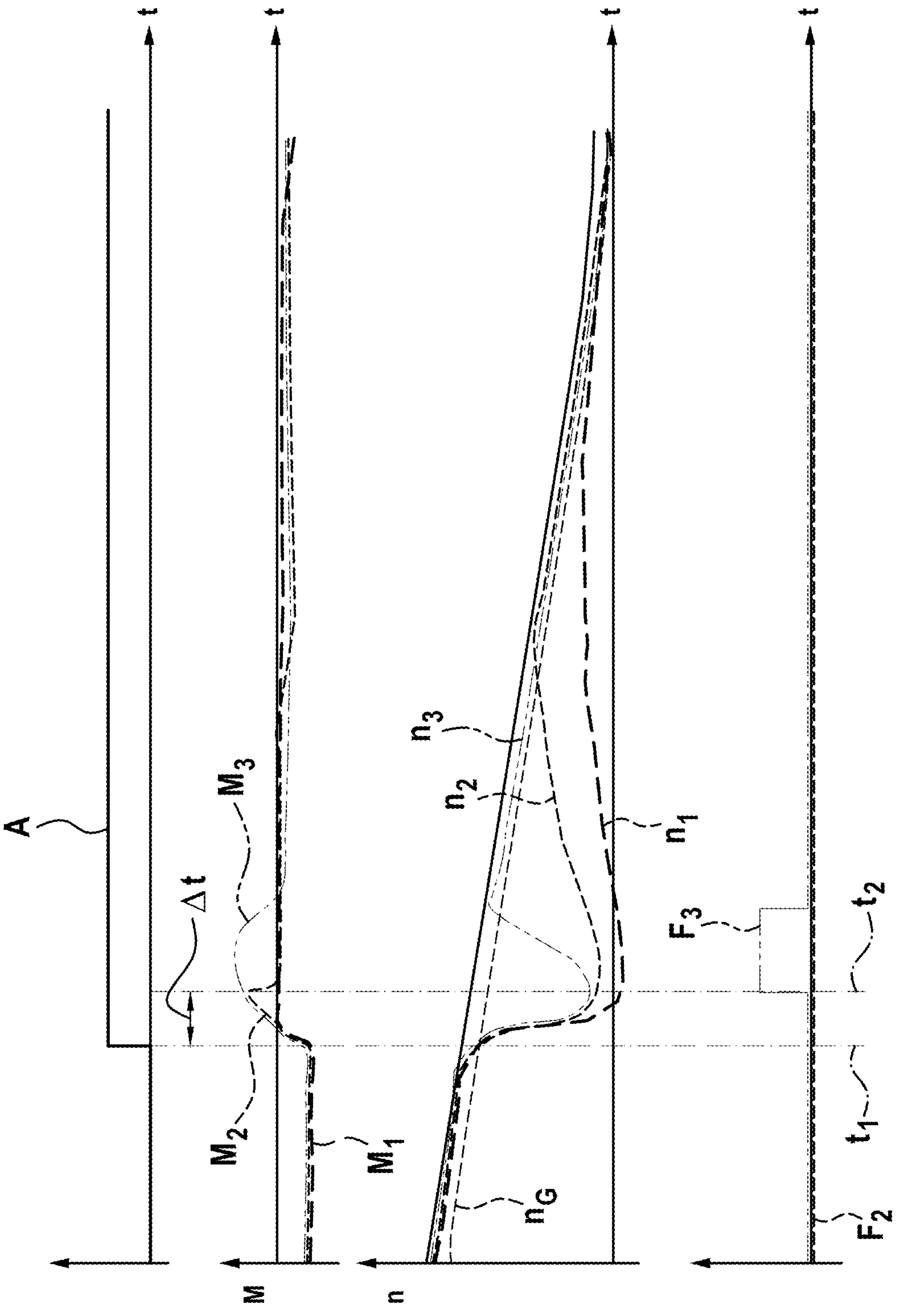
FIG. 3 shows course diagrams during a braking request, according to an example embodiment of the present invention.

FIG. 3 shows corresponding time course diagrams, which may occur during a braking request, in a first variant without performing the method, in a second variant in which the provision of the second setting range is terminated early, and in a third, particularly advantageous variant in which the method is performed in full and the resulting advantages are realized. The application in the case of an acceleration request is analogous to that described above.

In a first (upper) of four diagrams, a binary course is depicted, showing when the corresponding control A of the actuator 10 is started within the first setting range. It can be seen that this occurs at a point in time $t_1$.

In a second of the four diagrams arranged below, torque courses for the torque generated by the actuator 10 are shown for the three variants mentioned above. In a first variant without the method, a torque $M_1$ is plotted; in the second variant with only partial application of the method, a torque $M_2$ is plotted; and in the third variant with the full application of the method, a torque $M_3$ is plotted. All torques start as a negative braking torque. At the point in time $t_1$, they are increased towards zero torque.

This is triggered by the corresponding actual value of the axle speed, the course of which is shown, in the third of the four diagrams below, falling below the corresponding speed limit value $n_G$. The maneuver corresponds to a sudden change in the coefficient of friction during deceleration.

In the first variant, the actual value $n_1$ decreases the most, and it takes a very long time until the actual value $n_1$ exceeds the speed limit value $n_G$ again. Despite early control, the axle speed falls well below the specified speed limit and remains in this range for a very long time, with corresponding negative effects on steering control and stability.

In the second variant, the actual value $n_2$ is somewhat compensated by the fact that the second setting range is provided and the torque $M_2$ becomes positive at least for the specified period of time $\Delta t$ up to a second point in time $t_2$, i.e. it acts as a drive torque and the corresponding wheel accelerates again slightly. Although the actual value $n_2$ exceeds the speed limit value $n_G$ more quickly than in the first variant, it still takes quite a long time.

In this case, only the time-limited, autonomous setting range extension is used. The positive torque already reduces the risk of falling below the speed limit. However, the lack of permanent expansion means that the remaining deviation will persist for some time.

The smallest drop in and also the fastest return to or exceeding again of the speed limit value $n_G$ occurs in the third variant, where the actual value $n_3$ rises again more quickly because the release signal is received and the second setting range is provided over the period of time $\Delta t$ or beyond the second point in time $t_2$ and the corresponding torque $M_3$ is positive for a correspondingly longer period.

Here, the method is applied in full and a rapid return of the actual value $n_3$ above the speed limit value $n_G$ is achieved. In this variant, the release signal for a permanent setting range extension arrives at the speed controller in time to keep the setting range extended. The speed can then be returned to the speed limit very quickly.

The fourth (lower) of the four diagrams shows a corresponding binary course of the release signals in the second or third variant. In the second variant, as described above, no release signal is received, so the corresponding course $F_2$ remains at zero and accordingly the provision of the second setting range at the point in time $t_2$ is aborted.

Only in the third variant does the release signal arrive at the point in time $t_2$ just in time so that the corresponding curve $F_3$ becomes positive and the second setting range continues to be provided, at least as long as the release signal is received.

The invention claimed is:

1. A method for operating a motor vehicle, the motor vehicle having at least one axle with at least one wheel, wherein the wheel is assigned a wheel braking device with a controllable first actuator including an electric machine, and wherein the wheel is assigned a drive device with a controllable second actuator including an electric machine, the method comprising the following steps:

specifying, depending on an acceleration request or braking request, at least one torque setpoint for the first and second actuators and a speed limit value;

specifying a first setting range extending between a zero torque and the torque setpoint for a torque that can be generated by the second actuator;

controlling the second actuator within the first setting range to meet the acceleration request or the braking request;

recording an actual speed value, and comparing the actual speed value with the speed limit value;

based on the comparison detecting that the speed limit value is exceeded in the case of acceleration request or undershot in the case of a braking request, providing a second setting range which extends beyond the zero torque to a torque limit value with a sign deviating from the torque setpoint, and then controlling the second actuator within the second setting range.

2. The method according to claim 1, wherein an actual value of a wheel speed of the wheel and/or an actual value of an axle speed of the axle is recorded as the actual speed value.

3. The method according to claim 1, wherein the second setting range is provided only when the actual speed value deviates from the speed limit value beyond a specified tolerance.

4. The method according to claim 1, wherein the second setting range is provided only for a specified period of time.

5. The method according to claim 4, wherein the provision of the second setting range is maintained beyond the specified period of time when a specified release signal is detected within the specified period of time.

6. The method according to claim 5, wherein the release signal is: (i) generated by a control device assigned to the first actuator and/or a central control unit, and/or (ii) sent to a control device of the second actuator and/or (iii) received by a control device of the second actuator.

7. The method according to claim 1, wherein the provision of the second setting range is terminated when the actual speed value at least reaches the speed limit value again, including exceeds the speed limit value in the case of a braking request or falls below the speed limit value in the case of an acceleration request.

8. The method according to claim 1, wherein the torque setpoint and/or the speed limit value are specified by a central control unit.

9. The method according to claim 1, wherein each of the first and second actuators is assigned its own control device, which is connected to a central control unit for communication purposes, wherein each of the first and second actuators is controlled by the control device assigned to it.

10. A non-transitory machine-readable storage medium on which is stored a computer program for operating a motor vehicle, the motor vehicle having at least one axle with at least one wheel, wherein the wheel is assigned a wheel braking device with a controllable first actuator including an electric machine, and wherein the wheel is assigned a drive device with a controllable second actuator including an electric machine, the computer program, when executed by a computer, causing the computer to perform the following steps:

specifying, depending on an acceleration request or braking request, at least one torque setpoint for the first and second actuators and a speed limit value;

specifying a first setting range extending between a zero torque and the torque setpoint for a torque that can be generated by the second actuator;

controlling the second actuator within the first setting range to meet the acceleration request or the braking request;

recording an actual speed value, and comparing the actual speed value with the speed limit value;

based on the comparison detecting that the speed limit value is exceeded in the case of acceleration request or undershot in the case of a braking request, providing a second setting range which extends beyond the zero torque to a torque limit value with a sign deviating from the torque setpoint, and then controlling the second actuator within the second setting range.

11. An electronic control unit for a motor vehicle, the electronic control unit being specially adapted to operate a motor vehicle, the motor vehicle having at least one axle with at least one wheel, wherein the wheel is assigned a wheel braking device with a controllable first actuator including an electric machine, and wherein the wheel is assigned a drive device with a controllable second actuator including an electric machine, the electronic control unit being configured to perform the following steps:

specifying, depending on an acceleration request or braking request, at least one torque setpoint for the first and second actuators and a speed limit value;

specifying a first setting range extending between a zero torque and the torque setpoint for a torque that can be generated by the second actuator;

controlling the second actuator within the first setting range to meet the acceleration request or the braking request;

recording an actual speed value, and comparing the actual speed value with the speed limit value;

based on the comparison detecting that the speed limit value is exceeded in the case of acceleration request or undershot in the case of a braking request, providing a second setting range which extends beyond the zero torque to a torque limit value with a sign deviating from the torque setpoint, and then controlling the second actuator within the second setting range.

* * * * *